United States Patent [19]
Cai et al.

[11] Patent Number: 5,770,659
[45] Date of Patent: Jun. 23, 1998

[54] PROCESS FOR MAKING STORAGE-STABLE EPOXY-CAPPED POLYETHERESTER RESINS

[75] Inventors: Gangfeng Cai; Daniel M. Trauth, both of West Chester, Pa.; Lau S. Yang, Wilmington, Del.

[73] Assignee: Arco Chemical Technology, L.P., Greenville, Del.

[21] Appl. No.: 967,140

[22] Filed: Nov. 10, 1997

[51] Int. Cl.$^6$ .............................. C08F 20/00; C08G 63/82
[52] U.S. Cl. .................... 525/438; 528/274; 528/275; 528/280; 528/281; 528/282; 528/283; 528/286; 528/300; 528/301; 528/306; 528/307; 524/711; 524/773; 524/777; 524/783; 524/784; 524/785; 524/786; 524/845; 525/437; 525/445; 522/1; 522/93; 522/102
[58] Field of Search ................................. 528/274, 275, 528/280, 281, 282, 283, 286, 300, 301, 306, 307; 524/711, 773, 777, 783, 784, 785, 786, 845; 525/437, 438, 445; 522/1, 93, 102

[56] References Cited

U.S. PATENT DOCUMENTS

| | | | |
|---|---|---|---|
| 5,319,006 | 6/1994 | Yang et al. | 523/500 |
| 5,436,313 | 7/1995 | Klang et al. | 528/374 |
| 5,436,314 | 7/1995 | Yang et al. | 528/274 |
| 5,677,396 | 10/1997 | Klang | 525/445 |
| 5,696,225 | 12/1997 | Cai et al. | 528/297 |

*Primary Examiner*—Samuel A. Acquah
*Attorney, Agent, or Firm*—Jonathan L. Schuchardt

[57] ABSTRACT

Processes for making storage-stable epoxy-capped polyetherester resins are disclosed. In one process, a polyetherester resin is first made by inserting a carboxylic acid derivative into a polyether. Reacting the resin with a capping agent gives an intermediate resin with a reduced content of free carboxylic acid groups. Finally, the intermediate resin reacts with an epoxy compound in the presence of a finishing catalyst under conditions effective to give an epoxy-capped resin. The resins have low weight average molecular weights (less than about 8000), narrow molecular weight distributions (less than 6), and low viscosities, making them an excellent choice for low-VOC formulations. The finishing catalyst helps to minimize resin viscosity drift and improves shelf stability. Curing the resins with a vinyl monomer gives thermosets with an excellent balance of physical properties, including excellent water resistance.

20 Claims, No Drawings

PROCESS FOR MAKING STORAGE-STABLE EPOXY-CAPPED POLYETHERESTER RESINS

FIELD OF THE INVENTION

The invention relates to polyetherester resins. In particular, the invention is a process for making polyetherester resins that have good storage stability. Resins made by the process are particularly valuable in high-performance markets in the unsaturated polyester industry.

BACKGROUND OF THE INVENTION

Recently, we described new processes for making polyetherester resins from polyethers (see U.S. Pat. Nos. 5,319,006, 5,436,313, and 5,436,314, and 5,677,396). In each process, a polyether reacts with a cyclic anhydride, a dicarboxylic acid, or a diol diester in the presence of an "insertion" catalyst. The anhydride, dicarboxylic acid, or diol diester inserts randomly into carbon-oxygen bonds of the polyether to generate ester bonds in the resulting polyetherester resin. The polyetherester resin is then combined with a vinyl monomer, preferably styrene, and is cured to produce a polyetherester thermoset. Lewis acids, protic acids having a pKa less than about 0, and metal salts thereof are effective insertion catalysts. The insertion process provides a valuable and versatile way to make many unique polyetherester intermediates.

More recently (see application Ser. No. 08/608,379, filed Feb. 28, 1996, hereinafter "the '379 application"), we extended the insertion technology by developing a process for making high-performance polyetherester resins. These high-performance resins are made by chain extending a polyetherester resin (made by insertion) with a primary diol or a diepoxy compound. The high-performance resins give thermosets with improved high-temperature performance, better tensile and flex properties, and enhanced resistance to aqueous solutions compared with those made using the earlier polyetherester resins.

The epoxy-extended resins described in the '379 application have some important limitations. Some of the limitations appear to result from the presence of residual unreacted diepoxy compound. First, the resins can become more viscous over time. Thus, storage stability of products containing the resins is shorter than desirable. The viscosity increase with time suggests that undesired crosslinking reactions involving unreacted diepoxy compound continue to occur long after the resin synthesis is complete.

In addition to causing viscosity drift, the residual diepoxy compound plasticizes the resin, thereby reducing the stiffness and/or strength properties of thermosets made from the resin. When plasticizers are needed, it is easier to add the required amount later. Preferably, the plasticizing effect of the residual diepoxy compound could be avoided.

Resins made as described in the '379 application derive from acid-terminated polyetherester resins; i.e., the resins have only carboxylic acid end groups. Chain extension with a diepoxy compound produces resins with relatively high weight average molecular weights (Mw>8000) and broad molecular weight distributions (typical Mw/Mn=8 to 30). Unfortunately, resins having such high molecular weight and Mw/Mn values usually have correspondingly high viscosities that can limit their usefulness. For example, high-viscosity resins are impractical for typical "spray up" applications in the composites resin industry.

Low-viscosity resins also help to minimize the amount of volatile organic compounds (VOC) in formulations. Regulations that control the allowable amount of VOCs in commercial products are becoming ever more limiting; reduced resin viscosity helps formulators comply with the increasingly strict VOC rules.

Another drawback concerns resin cook time. Because diepoxy compounds react slowly with acid-terminated polyetherester resins, many hours may be needed to react out the residual diepoxy compound. Preferably, reaction times would be shorter and conversions would be more complete.

In sum, the unsaturated polyester industry has benefitted from the introduction of polyetherester resins made by insertion, particularly the high-performance resins made by chain extending polyetherester resins with a diepoxy compound, which offer water resistance, toughness, and excellent strength properties. However, a new process is needed. Preferably, the process would retain the benefits of earlier processes while offering its own advantages. In particular, a preferred process would reduce cook times and avoid the plasticizing effects of residual unreacted diepoxy compound. Preferably, the resins would have low molecular weights, narrow molecular weight distributions, and low viscosities, making them valuable for low-VOC formulations. Ideally, the process would minimize resin viscosity drift and would make it easy to produce storage-stable polyetherester formulations.

SUMMARY OF THE INVENTION

The invention is a process for making a storage-stable epoxy-capped polyetherester resin. The process comprises three steps. First, a polyether polyol reacts with a carboxylic acid derivative (anhydride, dicarboxylic acid, or diol diester) in the presence of an insertion catalyst to produce a polyetherester resin that has free carboxylic acid groups. Second, the polyetherester resin reacts with a capping agent to give an intermediate resin that has a reduced content of carboxylic acid groups compared with that of the polyetherester resin. Third, the intermediate resin reacts with an epoxy compound in the presence of a finishing catalyst under conditions effective to react free carboxylic acid groups in the intermediate resin with the epoxy compound to produce an epoxy-capped polyetherester resin that has a weight average molecular weight less than about 8000 and a Mw/Mn less than about 6.

The invention includes resins made by the process of the invention as well as thermosets made by reacting the resins with a vinyl monomer.

The process of the invention offers surprising and valuable advantages over the earlier process for making epoxy-extended polyetherester resins. First, the process gives epoxy-capped polyetherester resins in reduced cook times. Second, the process avoids the plasticizing effects of residual unreacted diepoxy compounds. Third, the process gives resins with low molecular weights, narrow molecular weight distributions, and low viscosities. Consequently, the resins are valuable for making low-VOC formulations. Fourth, the process minimizes viscosity drift, which makes it easier to prepare storage-stable polyetherester resin formulations. Finally, the process offers these advantages while maintaining the excellent water resistance, toughness, and strength properties of epoxy-extended polyetherester resins.

DETAILED DESCRIPTION OF THE INVENTION

The invention is a three-step process for making storage-stable, epoxy-capped polyetherester resins. In the first step, a polyether reacts with a carboxylic acid derivative in the presence of an insertion catalyst to produce a polyetherester resin.

Polyethers suitable for use in the invention derive from base or acid-catalyzed ring-opening polymerization of cyclic ethers such as epoxides, oxetanes, oxolanes, and the like, and mixtures thereof. The polyethers have oxyalkylene repeat units (—O—A—) in which A has from 2 to 10 carbon atoms, preferably from 2 to 4 carbon atoms. The polyethers can have different end groups, depending upon how the polyethers are made or modified. For example, the polyether can have hydroxyl, ester, ether, acid, or amino end groups, or the like, or combinations thereof. The polyethers can also incorporate other kinds of recurring units, such as ester groups. Mixtures of different types of polyethers can be used.

Preferred polyethers for use in the process of the invention are polyether polyols. Suitable polyether polyols include, for example, polyoxypropylene polyols, polyoxyethylene polyols, ethylene oxide-propylene oxide copolymers, polytetramethylene ether glycols, and the like, and mixtures thereof. Typically, the polyols have average hydroxyl functionalities from about 1 to about 8, and number average molecular weights from about 250 to about 25,000. Preferred polyether polyols have an average hydroxyl functionality within the range of about 2 to about 6, a hydroxyl number within the range of about 14 to about 260 mg KOH/g, and a number average molecular weight within the range of about 400 to about 12,000. Particularly preferred are polyoxypropylene diols and triols having a number average molecular weight from about 1000 to about 4000. Other examples of suitable polyols appear in U.S. Pat. No. 5,319,006, the teachings of which are incorporated herein by reference.

Suitable carboxylic acid derivatives are anhydrides, dicarboxylic acids, and diol diesters. Anhydrides useful in the process are cyclic anhydrides, which may be saturated or unsaturated. "Cyclic" anhydrides contain the anhydride functionality within a ring. Examples include phthalic anhydride and maleic anhydride. "Saturated" anhydrides contain no ethylenic unsaturation, but may contain aromatic rings. Examples include phthalic anhydride, propionic anhydride, trimellitic anhydride, and succinic anhydride. "Unsaturated" anhydrides contain ethylenic unsaturation that becomes incorporated into the polyetherester resin. Maleic anhydride is an example. Other examples of suitable anhydrides appear in U.S. Pat. No. 5,436,313, the teachings of which are incorporated herein by reference.

Dicarboxylic acids useful in the process are saturated or unsaturated. Preferred dicarboxylic acids are linear, branched, or cyclic $C_3$–$C_{40}$ aliphatic dicarboxylic acids and $C_6$–$C_{40}$ aromatic dicarboxylic acids. Examples include adipic acid, maleic acid, succinic acid, isophthalic acid, and the like, and mixtures thereof. Additional examples of suitable dicarboxylic acids appear in U.S. Pat. No. 5,436,314, the teachings of which are incorporated herein by reference.

Diol diesters useful in the process are reaction products of about 2 moles of a cyclic anhydride with about 1 mole of a diol. The diol diesters have two internal ester units, and two carboxylic acid end groups that result from ring opening of the cyclic anhydride. Suitable diol diesters can be made in other ways well known to those skilled in the art. For example, the diol can be esterified with a dicarboxylic acid or reacted with an acid halide. However, the anhydride route is most convenient. Preferred diol diesters have the general formula:

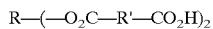

R—(—O$_2$C—R'—CO$_2$H)$_2$ in which R is a bivalent $C_2$–$C_{30}$ alkyl or aralkyl moiety derived from a diol, and R' is a bivalent $C_2$–$C_{20}$ alkyl or aryl moiety derived from a cyclic anhydride. Suitable diol diesters derive from $C_2$–$C_{30}$ diols, including, for example, ethylene glycol, propylene glycol, diethylene glycol, dipropylene glycol, triethylene glycol, tripropylene glycol, 2-methyl-1,3-propanediol, neopentyl glycol, 1,4-butanediol, 1,6-hexanediol, 1,4-benzenedimethanol, 1,4,cyclohexanedimethanol, bisphenol A, bisphenol F, alkoxylated bisphenols, and the like, and mixtures thereof. Preferred cyclic anhydrides from which the diol diesters derive are saturated or unsaturated $C_4$–$C_{20}$ cyclic anhydrides such as maleic anhydride, phthalic anhydride, itaconic anhydride, citraconic anhydride, and the like, and mixtures thereof. Additional examples of suitable diol diesters appear in U.S. Pat. No. 5,677,396, the teachings of which are incorporated herein by reference Suitable "insertion catalysts" are the ones previously described for inserting anhydrides, dicarboxylic acids, and diol diesters into polyethers. They include Lewis acids (e.g., zinc chloride, zinc bromide), protic acids that have a pKa less than about 0 (e.g., p-toluenesulfonic acid), and metal salts of the protic acids (e.g., zinc triflate). The catalyst is used in an amount effective to promote insertion of the carboxylic acid derivative into carbon-oxygen bonds of the polyether to produce a polyetherester resin. Suitable catalysts are described, for example, in U.S. Pat. Nos. 5,319,006, 5,436,313, 5,436,314, and 5,677,396, the teachings of which are incorporated herein by reference.

The polyether, carboxylic acid derivative, and insertion catalyst are heated under conditions effective to promote insertion of the carboxylic acid derivative at random into carbon-oxygen bonds of the polyether to produce a polyetherester resin. This step corresponds to the usual process for making a polyetherester resin as described in U.S. Pat. Nos. 5,319,006, 5,436,313, and 5,436,314, and 5,677,396. Some or all of the end groups of the polyetherester resin will be free carboxylic acid groups. The acid number of this resin is typically within the range of about 80 to about 120 mg KOH/g, preferably from about 90 to about 110 mg KOH/g, and most preferably from about 95 to about 105 mg KOH/g. While any desired reaction temperature can be used, it is preferred to perform this step at a temperature within the range of about 60° C. to about 300° C., more preferably from about 100° C. to about 250° C.

In the second step, the polyetherester resin reacts with a capping agent to produce an intermediate resin. The intermediate resin has a reduced content of carboxylic acid groups compared with that of the polyetherester resin produced in the first step. Preferably, the intermediate resin has an acid number within the range of about 50 to about 100 mg KOH/g, more preferably from about 70 to about 90 mg KOH/g, and most preferably from about 75 to about 85 mg KOH/g. While any desired reaction temperature can be used, it is preferred to perform this step at a temperature within the range of about 50° C. to about 300° C., more preferably from about 120° C. to about 250° C. The optimum temperature depends on which capping agent is used.

Capping agents suitable for use in the second step are compounds that can react with free carboxylic acid groups to produce an end group that will react slowly if at all with an epoxy compound in the next step. Because the intermediate resin has fewer carboxylic acid groups than the polyetherester resin from the first step, capping results in reduced chain extension of the intermediate resin upon subsequent reaction with the epoxy compound. This provides formulators more control over molecular weight build. Because a capping step is used, the ultimate epoxy-capped polyetherester resin will generally have a much lower weight average molecular weight (Mw) and narrower molecular weight distribution (Mw/Mn) than it would have had in the absence of an intermediate capping step.

Suitable capping agents include glycols (ethylene glycol, propylene glycol, dipropylene glycol, or the like) and alkylene oxides (ethylene oxide, propylene oxide, etc.), both of which give an intermediate resin having alcohol-type hydroxyl groups. Suitable capping agents also include monofunctional alcohols and phenols (which give esters of the carboxylic acid groups).

The amount of capping agent used depends on a number of factors, including, for example, the identity of the capping agent, the desired content of free carboxylic acid groups in the intermediate resin, and other factors. Preferably, the capping agent is used in an amount within the range of about 0.1 to about 20 wt. % based on the amount of polyetherester resin. A more preferred range is from about 0.5 to about 5 wt. %.

In the third step, the intermediate resin reacts with an epoxy compound in the presence of a finishing catalyst under conditions effective to react free carboxylic acid groups in the intermediate resin with the epoxy compound to produce an epoxy-capped polyetherester resin.

Suitable epoxy compounds have one or more epoxy groups available for reaction with the carboxylic acid groups of the intermediate resin. Epoxy resins, such as those derived from bisphenol A, are preferred epoxy compounds. Suitable epoxy resins include Shell Chemical's "EPON" resins such as EPON 828 resin, and Dow Chemical's "D.E.R." resins, such as D.E.R. 330 and D.E.R. 331 resins. Other suitable epoxy compounds include novolak resins (phenol/formaldehyde condensation products), brominated epoxy resins, aliphatic epoxy compounds, advanced epoxies (high molecular weight epoxy compounds), ether-containing epoxy compounds (diepoxide from diallyl ether, diglycidyl ethers of polyoxypropylene diols such as D.E.R. 732 resin), epoxidized fatty acids, and the like, and mixtures thereof.

The amount of epoxy compound needed depends on the nature of the intermediate resin, the type of epoxy compound, the desired properties of the epoxy-capped polyetherester resin, the ultimate thermoset properties sought, and other factors. Usually, at least about 1 wt. % of epoxy compound is used based on the amount of intermediate resin. Preferably, the epoxy compound is used in an amount within the range of about 1 to about 30 wt. %, more preferably from about 5 to about 25 wt. %, based on the amount of intermediate resin.

A "finishing catalyst" is used in the process of the invention to complete the reaction between free carboxylic acid groups in the intermediate resin with the epoxy compound. If a finishing catalyst is not used, we found that important properties of the epoxy-capped resin are adversely affected. In particular, the weight average molecular weight, molecular weight distribution, and viscosity increase dramatically (see Example 1 and Comparative Example 2 below).

Suitable finishing catalysts are compounds that accelerate the reaction between carboxylic acid groups and epoxy compounds. In addition, the finishing catalyst must not interfere with the resin curing system. Examples of such compounds are well known in the art, and many are listed in U.S. Pat. Nos. 3,317,465, 3,564,074, 3,634,542, and 3,637,618, the teachings of which are incorporated herein by reference. Preferred classes of finishing catalysts include tertiary amines or phosphines, alcoholates, tertiary aminophenols, onium salts (particularly those containing phosphorus, sulfur, or nitrogen, such as the phosphonium, sulfonium and ammonium salts of inorganic acids), imidazoles, alkanolamines, carboxylate salts, and the like, and mixtures thereof. Specific examples include 2,4, 6-tris (dimethylamino)phenol, 2,6-bis(dimethylamino)-4-methylphenol, 1, 4-diazabicyclo[2.2.2]octane (DABCO), triethylamine, tri-n-propylamine, diethanolamine, triethanolamine, tetra-n-butylammonium chloride, tri-n-octyl-methylammonium hydroxide, imidazole, 2-methylimidazole, triphenylphosphine, potassium acetate, sodium benzoate, sodium methoxide, diphenylmethylsulfonium chloride, triphenylmethylphosphonium iodide, and the like.

The amount of finishing catalyst needed depends on many factors, including the desired reaction time and degree, reaction temperature, identity of the finishing catalyst, identity of the intermediate resin, and other factors. Preferably, the amount of finishing catalyst used will be an amount sufficient to reduce the residual epoxy concentration to less than about 2 wt. %, and more preferably to less than about 0.5 wt. %. Generally, an amount of finishing catalyst within the range of about 1 ppm to about 5 wt. % based on the amount of intermediate resin is used; a more preferred range is from about 10 ppm to about 0.5 wt. %.

The epoxy-capping step is preferably performed at a temperature within the range of about 30° C. to about 180° C.; a more preferred range is from about 100° C. to about 160° C.

Obviously, the epoxy-capped resin has a reduced content of carboxylic acid groups compared with that of the intermediate resin. Preferably, the intermediate resin has an acid number less than about 50 mg KOH/g, and more preferably less than about 40 mg KOH/g.

The invention includes a two-step process for making epoxy-capped polyetherester resins. In this process, a polyetherester resin is first prepared in the usual way by insertion of a carboxylic acid derivative into carbon-oxygen bonds of a polyether. In step two, the polyetherester resin reacts with an alkylene oxide and an epoxy compound in the presence of a finishing catalyst under conditions effective to produce an epoxy-capped polyetherester resin. This process essentially accomplishes two capping reactions in the same step. The more-reactive alkylene oxide reacts preferentially with free carboxylic acid groups of the polyetherester resin. The remaining acid groups (and some hydroxyl groups produced from the reaction with alkylene oxide) then react with the epoxy compound to give the epoxy-capped polyetherester resin.

Alkylene oxides suitable for use are the same ones well known for use in ring-opening polymerization reactions, and include, for example, ethylene oxide, propylene oxide, butylene oxide, styrene oxide, and the like, and mixtures thereof.

The amount of epoxy compound used is as described above, with the amount used being based on the amount of polyetherester resin. Thus, it is preferred to use an amount of epoxy compound within the range of about 1 to about 30 wt. %. Preferably, the alkylene oxide is used in an amount within the range of about 0.5 to about 5 wt. %.

In contrast to previously described epoxy-extended polyetherester resins (see application Ser. No. 08/608,379, filed Feb. 28, 1996), epoxy-capped polyetherester resins made by either process of the invention have lower weight average molecular weights, and much lower polydispersities and viscosities. Epoxy-capped resins of the invention have weight average molecular weights (Mw) less than about 8000 and Mw/Mn values less than about 6. Preferably, resins of the invention have Mw values less than 6000 and Mw/Mn values less than about 5.

Epoxy-capped polyetherester resins made by the process of the invention are valuable for making polyetherester thermosets. These thermosets are made by reacting an epoxy-capped polyetherester resin with a vinyl monomer according to methods that are well known for making thermosets from unsaturated polyester resins. Typically a resin mixture that contains vinyl monomer is combined with a free-radical initiator and a cobalt promoter at room or elevated temperature, and the mixture is cured to give a solid product that may be post-cured if desired by heating at elevated temperature. Suitable vinyl monomers, free-radical initiators, and promoters are well known in the art. Examples appear in U.S. Pat. No. 5,319,006, the teachings of which are incorporated herein by reference. The thermosets can include fillers, glass fibers, pigments, or other additives or reinforcing materials.

The process of the invention offers surprising and valuable advantages over the earlier process for making epoxy-extended polyetherester resins. First, the process gives epoxy-capped polyetherester resins in reduced cook times. Without a finishing catalyst, reaction of an intermediate resin with an epoxy compound can be incomplete even after 4–6 hours of heating. In contrast, the process of the invention (which includes a finishing catalyst) enables efficient epoxy capping in 2 hours or less.

Second, the process avoids the plasticizing effects of residual unreacted diepoxy compounds. As a result, thermosets made from the resins retain good stiffness and strength properties.

Third, the process gives resins with low weight average molecular weights, narrow molecular weight distributions, and low viscosities. Because the resins have low viscosity, their usefulness in thermoset applications is broad. For example, epoxy-capped resins of the invention are non-viscous enough to use in "spray up" applications in the composites industry. Low viscosity resins also minimize the amount of vinyl monomer needed for thermosets. Consequently, the resins are valuable for making low-VOC formulations.

Fourth, the process minimizes viscosity drift, which makes it easier to prepare storage-stable polyetherester resin formulations. As noted above, earlier processes that did not include a finishing catalyst gave resins that contained traces of unreacted epoxy compound. Reaction of the epoxy compound over time during storage increases resin viscosity and reduces the shelf life of the product. The process of the invention overcomes these issues, and yields a storage-stable resin that formulators can depend on for reproducible processing characteristics.

Finally, the process offers these advantages while maintaining the excellent water resistance, toughness, and strength properties of thermosets from epoxy-extended polyetherester resins (see Table 1). As the table shows, flexural strength and modulus properties remain impressive even after seven days in boiling water, aqueous potassium hydroxide, or aqueous hydrochloric acid.

The following examples merely illustrate the invention. Those skilled in the art will recognize many variations that are within the spirit of the invention and scope of the claims.

EXAMPLE 1

Preparation of an Epoxy-Capped Polyetherester Resin

A twelve-liter reactor equipped with mechanical stirrer, nitrogen sparger, and condenser is charged with a polyoxypropylene diol (2000 mol. wt., 4726 g), maleic anhydride (3800 g, 38 wt. %), and propylene glycol (1475 g). p-Toluenesulfonic acid (7.5 g, 0.075 wt. %) is added, and the reaction mixture is rapidly heated to 195° C. The mixture is heated at 195° C. for 7 to 8 h, or until the acid number drops to 95 to 105 mg KOH/g. More propylene glycol (244 g) is added, and heating continues for another hour or two until the acid number drops to 80 to 85 mg KOH/g. The mixture is cooled to 160° C., and a mixture of 2,4,6-tris (dimethylamino)phenol (2.25 g, 200 ppm) in propylene glycol (10 g) is added. After 5 to 10 minutes, EPON 828 epoxy resin (2250 g, product of Shell Chemical) that has been preheated to 100° C. is added. The reaction mixture is heated at 150° C. for 2 to 6 hours, or until the acid number dips to 15 to 40 mg KOH/g. Hydroquinone (0.8 g) is added, the mixture is stirred for at least 10 min., and the product is cooled to about 110° C. The resin is blended with styrene (to 65 wt. % resin) that contains t-butylcatechol and methyl-t-butylhydroquinone inhibitors, and the resin solution is quickly cooled to room temperature in an ice-water bath. The final resin contains 35 wt. % styrene, 65 ppm hydroquinone, 50 ppm t-butylcatechol, and 150 ppm methyl-t-butylhydroquinone. The resin has Mn=1860, Mw=7190, Mw/Mn=3.9. Viscosity (cps, at 35 wt. % styrene): 1740.

COMPARATIVE EXAMPLE 2

The procedure of Example 1 is followed, except that the finishing catalyst (2,4,6-tris(dimethylamino)phenol) is eliminated from the formulation. The resulting resin has Mn=1800, Mw=21,000, Mw/Mn=12. Viscosity (cps, at 35 wt. % styrene):2500.

EXAMPLE 3

Preparation of a Polyetherester Thermoset

A thermoset polymer is prepared by diluting a sample of the epoxy-capped polyetherester resin of Example 1 to 45 wt. % styrene content, combining the solution with 0.2 wt. % of cobalt naphthenate solution (6% active cobalt), and 1.25 wt. % of DDM-9 initiator (MEK peroxide in mineral oil containing 9% active oxygen, product of Atochem), and allowing it to cure at room temperature for 16 h. The resulting thermoset product is post-cured at 100° C. for 5 h. Results of physical testing appear in Table 1.

TABLE 1

| Physical Properties of a Polyetherester Thermoset from the Resin of Example 1 | | |
|---|---|---|
| Tensile strength (psi) | | 8930 |
| Tensile modulus (kpsi) | | 442 |
| Tensile Elongation (%) | | 3.3 |
| Barcol Hardness | Before | 28 |
|  | After 7-day water boil | 15 |
|  | After 7-day aq. KOH boil | 20 |
|  | After 7-day aq. HCl boil | 15 |
| Flexural strength (psi) | Before | 17,100 |
|  | After 7-day water boil | 14,000 |
|  | After 7-day aq. KOH boil | 15,100 |
|  | After 7-day aq. HCl boil | 15,100 |
| Flexural modulus (kpsi) | Before | 469 |
|  | After 7-day water boil | 413 |
|  | After 7-day aq. KOH boil | 405 |
|  | After 7-day aq. HCl boil | 402 |

The preceding examples are meant only as illustrations; the following claims define the scope of the invention.

We claim:

1. A process for making a storage-stable, epoxy-capped polyetherester resin, said process comprising:

(a) reacting a polyether with a carboxylic acid derivative selected from the group consisting of anhydrides, dicarboxylic acids, and diol diesters in the presence of an insertion catalyst under conditions effective to promote insertion of the carboxylic acid derivative into carbon-oxygen bonds of the polyether to produce a polyetherester resin having free carboxylic acid groups;

(b) reacting the resin with a capping agent to produce an intermediate resin having a reduced content of carboxylic acid groups compared with that of the polyetherester resin produced in step (a); and (c) reacting the intermediate resin with an epoxy compound in the presence of a finishing catalyst under conditions effective to react free carboxylic acid groups in the intermediate resin with the epoxy compound to produce an epoxy-capped polyetherester resin that has a weight average molecular weight less than about 8000 and a Mw/Mn less than about 6.

2. The process of claim 1 wherein the polyether is a polyether polyol having an average hydroxyl functionality within the range of about 1 to about 6, a hydroxyl number within the range of about 14 to about 260 mg KOH/g, and a number average molecular weight within the range of about 400 to about 12,000.

3. The process of claim I wherein the insertion catalyst is selected from the group consisting of Lewis acids, protic acids that have a pKa less than about 0, and metal salts of the protic acids.

4. The process of claim 1 wherein step (a) is performed at a temperature within the range of about 60° C. to about 300° C.

5. The process of claim 1 wherein step (b) is performed at a temperature within the range of about 50° C. to about 300° C.

6. The process of claim 1 wherein step (c) is performed at a temperature within the range of about 30° C. to about 1 80° C.

7. The process of claim 1 wherein the capping agent is selected from the group consisting of glycols, glycol ethers, alcohols, and phenols.

8. The process of claim 1 wherein the capping agent is used in an amount within the range of about 0.1 to about 20 wt. % based on the amount of polyetherester resin.

9. The process of claim 1 wherein the epoxy compound is an epoxy resin based on bisphenol A.

10. The process of claim 1 wherein the epoxy compound is used in an amount within the range of about 1 to about 30 wt. % based on the amount of intermediate resin.

11. The process of claim 1 wherein the finishing catalyst is selected from the group consisting of tertiary amines, tertiary phosphines, alcoholates, tertiary aminophenols, onium salts, imidazoles, alkanolamines, carboxylate salts, and mixtures thereof.

12. The process of claim 1 wherein the epoxy-capped polyetherester resin has a weight average molecular weight less than about 6000 and a Mw/Mn less than about 5.

13. A process for making a storage-stable, epoxy-capped polyetherester resin, said process comprising:

(a) reacting a polyether with a carboxylic acid derivative selected from the group consisting of anhydrides, dicarboxylic acids, and diol diesters in the presence of an insertion catalyst under conditions effective to promote insertion of the carboxylic acid derivative into carbon-oxygen bonds of the polyether to produce a polyetherester resin having free carboxylic acid groups;

(b) reacting the resin with an alkylene oxide and an epoxy compound in the presence of a finishing catalyst, under conditions effective to produce an epoxy-capped polyetherester resin that has a weight average molecular weight less than about 8000 and a Mw/Mn less than about 6.

14. The process of claim 13 wherein the polyether is a polyether polyol having an average hydroxyl functionality within the range of about 1 to about 6, a hydroxyl number within the range of about 14 to about 260 mg KOH/g, and a number average molecular weight within the range of about 400 to about 12,000.

15. The process of claim 13 wherein the insertion catalyst is selected from the group consisting of Lewis acids, protic acids that have a pKa less than about 0, and metal salts of the protic acids.

16. The process of claim 13 wherein the alkylene oxide is used in an amount within the range of about 0.5 to about 5 wt. %, and the epoxy compound is used in an amount within the range of about 1 to about 30 wt. %, both amounts based on the amount of polyetherester resin.

17. An epoxy-capped polyetherester resin made by the process of claim 1.

18. An epoxy-capped polyetherester resin made by the process of claim 13.

19. A thermoset which comprises the reaction product of a vinyl monomer and the epoxy-capped polyetherester resin of claim 1.

20. A thermoset which comprises the reaction product of a vinyl monomer and the epoxy-capped polyetherester resin of claim 13.

* * * * *